Dec. 13, 1960 G. R. BROWN ET AL 2,964,465
ADSORPTION-DESORPTION PROCESS FOR THE REMOVAL OF
MINOR AMOUNTS OF SOLVENT FROM THE PRODUCT
STREAMS OF SOLVENT-EXTRACTED NAPHTHAS
Filed Nov. 28, 1958 2 Sheets-Sheet 1

INVENTORS
GLENN R. BROWN &
RICHARD W. ASMUS
BY
Leland L. Chapman
ATTORNEY

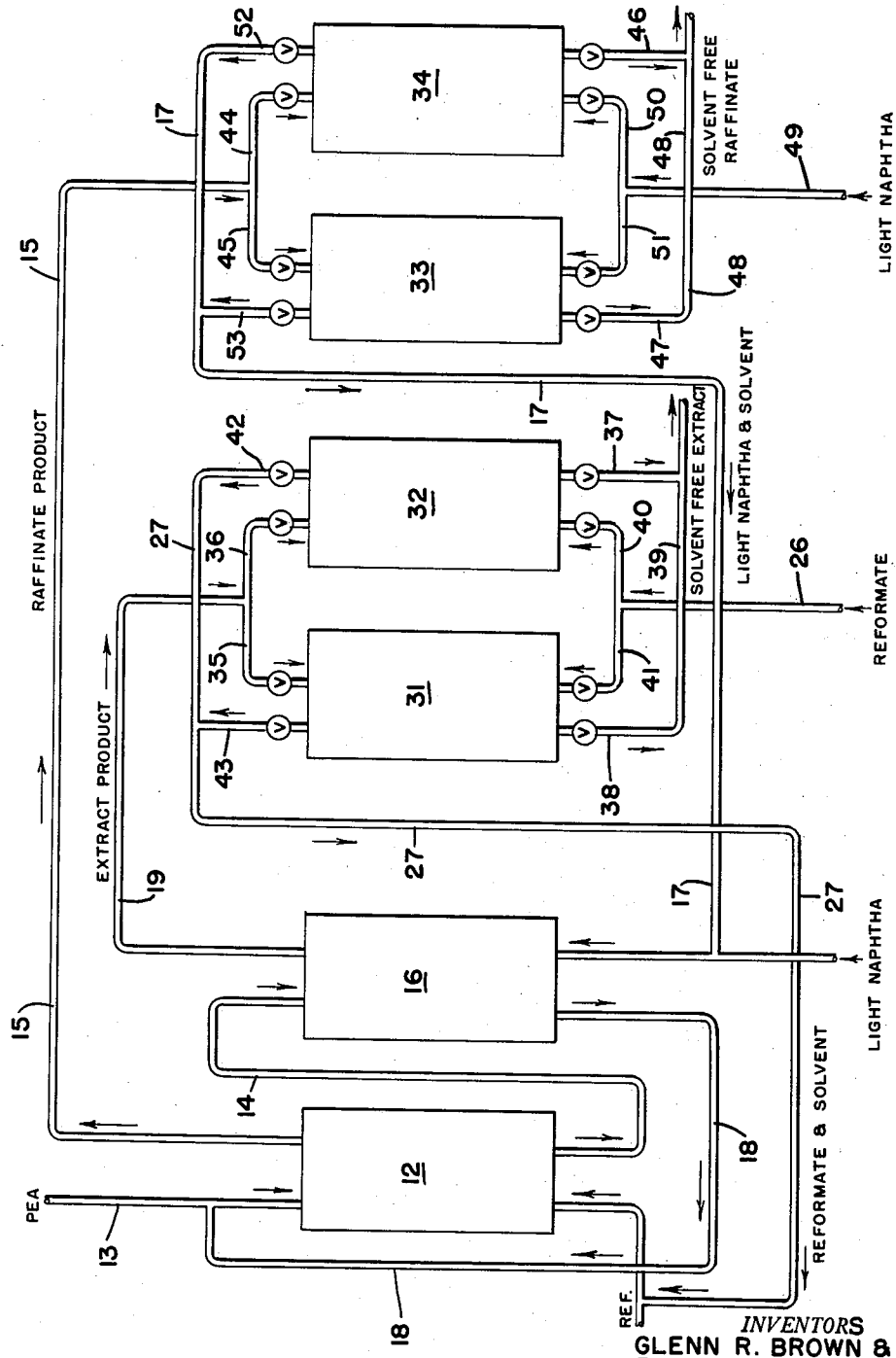

United States Patent Office 2,964,465
Patented Dec. 13, 1960

2,964,465

ADSORPTION-DESORPTION PROCESS FOR THE REMOVAL OF MINOR AMOUNTS OF SOLVENT FROM THE PRODUCT STREAMS OF SOLVENT-EXTRACTED NAPHTHAS

Glenn R. Brown, Solon, and Richard W. Asmus, Cleveland, Ohio, assignors to The Standard Oil Company, Cleveland, Ohio, a corporation of Ohio Filed Nov. 28, 1958, Ser. No. 777,127

7 Claims. (Cl. 208—314)

This invention relates to a process for the removal of minor amounts of a selective solvent remaining in the product streams obtained from the solvent extraction of catalytically reformed naphthas.

Catalytic reforming is widely used in the petroleum industry today as a means of upgrading the octane rating of virgin naphthas obtained from crude oil boiling in the range of 200 to 450° F., or portions thereof, so as to make these reformed naphthas more valuable blending stocks in the preparation of high octane commercial gasolines. In this process a significant portion of the low octane naphthenic and other non-aromatic ingredients of naphtha are converted under high pressures and temperatures in the presence of a catalyst into higher octane aromatic compounds by the dehydrogenation of cycloparaffins or dehydrocyclization of paraffins. The product of this catalytic reforming operation is commonly referred to in the art as "catalytic reformate" or "reformate." The higher the aromatic content of the reformate, the higher is the octane rating and the more valuable the reformate becomes as a blending stock for commercial gasolines. However, since the catalytic reforming operation does not completely convert the naphtha feed into aromatic ompounds, it is highly desirable to concentrate the aromatic portion of the reformate from the catalytic reforming operation before this product is incorporated into a motor fuel. This may readily be accomplished by the solvent extraction of catalytic reformate with a solvent which will selectively separate the aromatic compounds from the remainder of the reformate. One of the drawbacks of such a process, however, has been that the product streams are contaminated with minor amounts of the selective solvent. Accordingly, this invention is concerned with the removal and recovery of such minor amounts of solvent from the products resulting from the solvent extraction of catalytic reformate. By means of this invention, the products are not only enhanced by removal of the solvent but the solvent is recovered for re-use in the extraction process, thereby offering obvious economic advantages.

In conducting the solvent extraction of the catalytic reformate, the reformate is contacted in an extraction zone with a selective solvent, resulting in the yield of two separate phases. The various solvents for use in this extraction process are well known in the art. One class of solvents known to the art which finds particular utility for solvent extracting catalytic reformate are polar organic solvents.

One group of compounds of this class are the glycols, the polyglycols, and their derivatives. Glycols and polyglycols which are effective solvents include mono-, di-, tri-, and tetra-ethylene glycols, particularly diethylene glycol, mono-, di-, and tri-propylene glycols and mono-, di-, and tri-butylene glycols. Derivativees of these compounds which are effective solvents include certain glycol ethers, such as the Cellosolve series of compounds (defined structurally as the alkyl ethers of ethylene glycol), including methyl-, ethyl-, propyl-, and butyl-Cellosolve; and the Carbitols (defined structurally as the alkyl ethers of diethylene glycol), such as methyl-, ethyl-, proyl-, and butyl-Carbitols.

Another group of compounds of this class are the hydroxyamine compounds and the derivatives. These include phenylethanolamine, phenyldiethanolamine, triethanolamine, diethylaminoethanol, dioctylaminoethanol, ethylphenylethanolamine, monoethanolamine, diethanolamine, monoisopropanolamine, triisopropanolamine, diisopropanolamine, N - morpholinethanol, hydroxyethylethanoldiamine, triethanolamine abietate, triethanolamine naphthenate, butyl diethanolamine, N - dibutylaminoethanol, p-tertiary-armyl phenyldiethanolamine, p-tertiary-amyl phenylmonoethanolamine, diethylamino - 2,3 - propanediol, etc. Of this latter group, phenylethanolamine, in particular, has been found a very effective selective solvent for this extraction process, and the invention will be described in connection with this solvent.

The extract phase from the extraction operation contains the bulk of the solvent employed. The major quantity of this solvent is removed from the extract by conventional means. For example, the solvent may be separated from the extract phase by simple distillation. A preferred process to effect this separation, however, is disclosed in co-pending application Serial No. 594,927, assigned to our assignee. This process involves the re-extraction of the solvent-containing extract layer with a predominantly aliphatic hydrocarbon liquid boiling within the motor gasoline range so as to dissolve the aromatic compounds therein, releasing the solvent to be recycled to the first extraction zone. The aliphatic hydrocarbon liquid used for this re-extracting step is disclosed as hydrocarbons suitable for incorporation into a finished gasoline in which preferably a predominant part has a boiling range overlapping the boiling range of the aromatic hydrocarbon fraction extracted from the catalytic reformate.

One such suitable hydrocarbon fraction is alkylate, which is produced by the low temperature alkylation of iso-butane with butylenes in the presence of a mineral acid catalyst. A preferred hydrocarbon mixture is a light naphtha fraction boiling between 75° F. and 300° F., which may be obtained from a crude oil by distillation. Butane may also be used, but due to butane's low boiling point it may be necessary to stabilize the final gasoline, depending upon the vapor pressure desired. Other suitable hydrocarbon fractions may include isomerized naphtha which is produced by treatment of virgin naphtha over a Friedel-Crafts catalyst, and "motor polymer" which is a product of a catalytic polymerization of propylene or butylene in the presence of a phosphoric acid catalyst, boiling in the motor gasoline range.

Regardless of the method employed, it is quite difficult to obtain a complete removal of solvent from the extract phase, and hence minor amounts of the selective solvent usually remain in the aromatic product. Similarly, small amounts of solvent are included in the raffinate phase obtained from the extraction operation. The amount of solvent remaining in these products will vary depending upon process conditions selected for the extraction process and the particular solvent, and it may vary widely in the range of 0.01% up to about 5% by weight of the total hydrocarbon stock. In many instances this minor amount of solvent remaining in the product streams is substantial enough to affect the over-all economics of the process, and in still other instances this residual solvent may interfere with the intended application for the hydrocarbon stock.

It is therefore the object of this invention to provide an adsorption-desorption process to effectively remove and recover the minor amounts of solvent remaining in the products taken from the solvent extraction of catalytic reformate.

Briefly stated, the invention comprises the step of contacting each product stream with an adsorption bed containing adsorbent particles for the selective solvent, and upon saturation of the bed, the step of desorbing the adsorption bed by passing a hydrocarbon over the bed to remove the solvent laid down during the contacting step. The hydrocarbon thus taken from the bed in which the solvent is dissolved may then be conveniently returned to the primary process.

The preferred hydrocarbon for the desorption is catalytic reformate, but aliphatic hydrocarbon liquids of the type disclosed heretofore to accomplish the re-extraction of a solvent-containing extract layer may also be used as the desorbing medium in the process of this invention. When catalystic reformate is used as the desorbing liquid, the reformate taken from the adsorption bed containing the dissolved solvent may be conveniently transferred to the primary extraction zone of the solvent extraction process. It will be apparent that the use of an aliphatic hydrocarbon as a desorbing medium may be best used when employing the re-extraction step of the solvent-containing extract phase in a secondary extraction zone as previously described so that the aliphatic hydrocarbon liquid taken from the adsorption bed in which the solvent is dissolved may be conveniently transferred to the secondary extraction zone.

The use of catalytic reformate and/or light naphtha as a desorbing medium in the desorption step not only eliminates the cost of providing a separate process or means for desorbing the adsorbent bed, but also provides a simple medium to recycle the solvent to the extraction zone without the need of another separation step, as would be required if a separate process or means were employed for desorbing the adsorbent bed. Moreover, many such separation techniques might cause the degradation of the recovered solvent, particularly where the solvent is phenylethanolamine, making it unsuitable for further use.

Only one adsorption bed is required in the operation of this invention. However, as a practical matter, it may be desirable to employ two or more beds. When using one bed in the process, only one stream, either the extract product or the raffinate product, may be treated at a time; and if the product stream being treated is being produced during the time the bed is undergoing desorption, storage must be provided for this production. Of course, if it is desired to also treat the other product stream, this will have to be done at another time and additional storage must be provided to accommodate this material in the interim.

By providing two beds, one product stream may be alternated between the two beds so that one bed is undergoing adsorption while the other bed is being desorbed, resulting in the continuous treatment of the product stream. With this arrangement, the other product stream is stored for treatment at another time. It is also possible with two beds to treat both product streams at the same time, using a separate bed for each product stream. With this arrangement, the desorption cycles on each bed can be staggered so that the flow of a single hydrocarbon desorbent can be alternated between the two beds or the desorption cycles on the beds may be concurrent so that two different hydrocarbon desorbents are employed simultaneously.

By providing four adsorption beds wherein two separate beds are available for each product stream, the overall process may be made fully continuous in that one bed of each stream may be undergoing an adsorption cycle while the second bed in each stream is being desorbed. Various other arrangements of the beds and the flow of product streams and desorbing liquids to the beds will become obvious to one practiced in the art.

The nature of the adsorbent materials is not critical in the process, and any solid particles having adsorbent characteristics may be employed, such as, for example, various types of commercially available charcoals, clays, bone chars, bauxites, and spent catalytic cracking catalysts. The particle size of the solid adsorbent and the size of the bed are not critical and will depend in large part on the volume of the product stream that must be treated. In general, the particle size of the adsorbent may vary from 4 to 100 mesh. Flow rate of the product stream need only be sufficient to insure good contact within the bed, and normally the flow rate may vary from space velocities of approximately 1 to 10 volumes of product stream feed per hour per volume of bed.

The adsorption cycle may be conducted at atmospheric temperature and pressure. It is preferred, however, that adsorption be conducted at temperatures of approximately 80° F. to 180° F., but below 250° F. so as to avoid polymerization of any olefinic compounds which may be present in the products treated and to avoid degradation of the solvent. Enough pressure may be used if necessary to keep the hydrocarbons in the liquid phase at the temperature employed, but there is no advantage of higher pressures. On the other hand, if the streams are under pressure due to other considerations in the process, almost any pressure can be employed.

The desorption cycle may be conducted at the same temperature as the temperature of adsorption. However, it is found that the rate of the desorption cycle may be significantly improved by conducting the desorption cycle at increased temperatures. By increasing the temperature in the bed, the adsorption bonds holding the solvent are weakened and the solvent is more readily removed by the desorbent passed through the bed during the desorption cycle. In general, temperature increases within 100° F. above the temperature of adsorption will be adequate to cause this effect in the desorption rate.

Other variables affecting the rate of desorption include the rate of flow of desorbent through the bed, the selection of adsorbent particle size, and agitation of the desorbing medium within the bed. These conditions can normally be selected so that the time of the desorption cycle can be made the equivalent of the time of the adsorption cycle if so desired.

A more complete understanding of the invention may be gained from the following working examples, taken together with the patent drawings in which:

Figure 3 shows a schematic flow diagram of the over-all all process employing four adsorption beds.

Pumps, heat exchangers, and other auxiliary process equipment are not shown on the figures, but the use of such means is contemplated and the manner of using such equipment will be obvious to those skilled in the art upon reading this description. A minimum of valve means are included to make the drawings more understandable.

Figure 1:
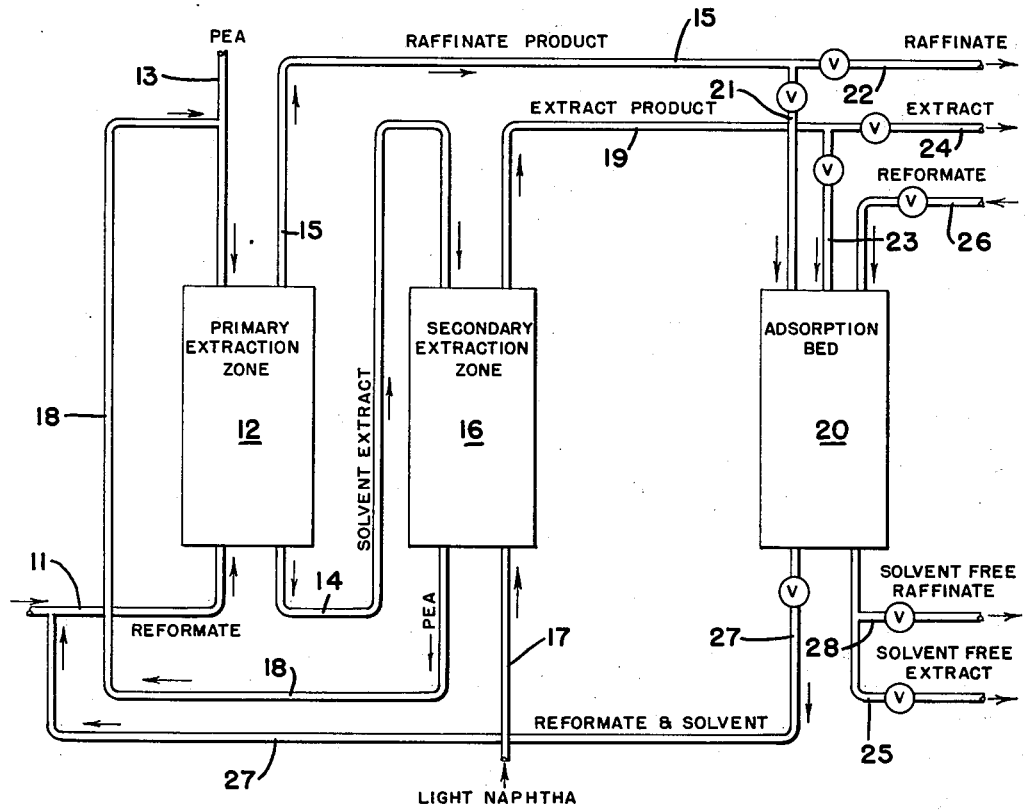
Figure 1 shows a schematic flow diagram of the over-all process employing one adsorption bed.

Referring now to Figure 1, 3600 b.p.s.d. catalytic reformate having a boiling range of 180 to 360° F. and containing 45% aromatics is fed to primary extraction zone 12 by means of conduit 11. 10,800 b.p.s.d. phenylethanolamine is introduced into the extraction zone 12 by means of conduit 13. The zone is maintained at a temperature of 125° F. and a pressure of 75 p.s.i.g. Separate phases are formed in the extraction zone 12, and the raffinate product stream comprising principally the non-aromatic portions of the catalytic reformate containing 1.0% phenylethanolamine leaves the extraction zone by means of conduit 15. This product stream is then fed to storage by opening the valve in conduit 22. This material may be returned subsequently for treatment in adsorption bed 20, if desired, by a reverse flow through the valve in conduit 22, together with opening the valve in conduit 21. When desired, however, the raffinate product stream in conduit 15 may be passed directly to adsorption bed 20 for treatment by the adsorption-desorption process of this invention, as will be described hereinafter. The solvent extract phase comprising the major portion of the solvent and the aromatic portion of the catalytic reformate leaves the extraction zone 12 by means of the conduit 14 whereby it is transferred to a secondary extraction zone 16. 6400 b.p.s.d. of a paraffinic virgin light naphtha having a boiling range of 80 to 165° F. is introduced into the extraction zone 16 by means of conduit 17. This zone is maintained at a temperature of 125° F. and a pressure of 75 p.s.i.g. Separate phases are again obtained in the extraction zone 16, one phase consisting essentially of phenylethanolamine is withdrawn from the extraction zone 16 by means of conduit 18 which returns the solvent to the first extraction zone 12. The second phase obtained in the second extraction zone 16 is a mixture of aromatics and paraffinic hydrocarbons, together with 3.20% of solvent; and this mixture, which may be referred to as the extract product stream, leaves the extraction zone 16 by means of conduit 19. This product stream is then transferred to adsorption bed 20 for treatment by the adsorption-desorption process of this invention by opening the valve in conduit 23.

Adsorbent bed 20, having a volume of 3840 cu. ft. containing 96,000 lbs. of cocoanut charcoal with a particle size in the range of 10 to 20 is maintained at a temperature of 125° F. and a pressure of 75 p.s.i.g. The extract product stream from conduit 19 is introduced to bed 20 by means of conduit 23 at a rate of 8000 b.p.s.d. and the effluent product is removed from bed 20 by means of opening the valve in conduit 25 and after further treatment may be used as such as a motor fuel or as a blending component for a motor fuel. Flow at the above specified rate is continued through bed 20 until the effluent product in conduit 25 has a concentration of phenylethanolamine in excess of 10 p.p.m. whereupon the adsorption cycle is suspended, the valves in conduits 23 and 25 are closed, and the bed prepared for a desorption cycle by adjusting the temperature of bed 20 to 180° F. Any extract product produced during the desorption cycle will be passed to storage by opening the valve in conduit 24. Such production may be returned to the bed for treatment at another time if desired by reserve flow through the valve in conduit 24, together with opening the valve in conduit 23.

To start the desorption cycle, the valves in conduits 26 and 27 are opened. Catalytic reformate identical to the feed material to primary extractor 12 is used as the desorbing medium and is introduced to bed 20 by means of conduit 26 at the flow rate of 3600 b.p.s.d. The reformate with the solvent dissolved therein is taken from bed 20 and transferred by means of conduit 27 to conduit 11 for introduction to primary extractor 12. Flow of reformate is continued at the above specified rate until the amount of solvent in conduit 27 is down to 5 p.p.m. phenylethanolamine, whereupon the desorption cycle is suspended and the valves in conduits 26 and 27 are closed. After a corresponding temperature adjustment, bed 20 is again prepared for an adsorption cycle.

In like manner, an adsorption cycle is conducted on the raffinate product stream containing 1.0% phenylethanolamine resulting from the primary extraction zone 12. 2000 b.p.s.d. of said stream is introduced from conduit 15 to bed 20 by closing the valve in conduit 22 and opening the valve in conduit 21. The solvent is adsorbed on the particles in bed 20 as before, and the effluent product is removed from bed 20 by opening the valve in conduit 28. Flow at the above specified rate is continued through bed 20 until the concentration of phenylethanolamine in conduit 28 is in excess of 10 p.p.m., whereupon the adsorption cycle is suspended, the valve in conduit 22 is opened, the valves in conduits 21 and 28 are closed, and the bed is regenerated by a desorption cycle in the identical manner previously described.

Figure 2:
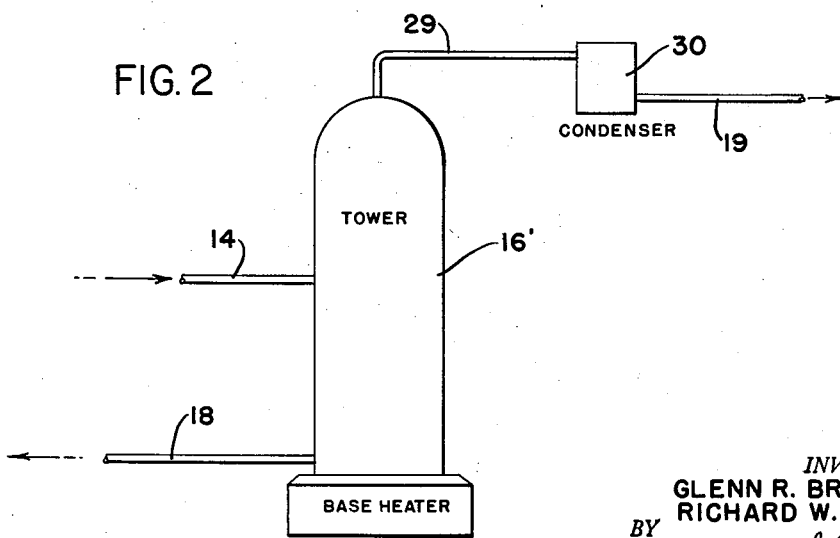
Figure 2 represents a fragment of the flow diagram of Figure 1 and shows an alternate means of removing the bulk of the solvent from the solvent extract phase.

Referring now to Figure 2, a means alternative to the secondary extraction zone 16 is shown for removing the bulk of the solvent from the solvent extract phase. In accordance with this scheme, the solvent extract phase is introduced by means of conduit 14 to fractionating tower 16' having a base heater. The mixture is distilled within tower 16', the hydrocarbon compounds being vaporized overhead through conduit 29 to condenser 30 containing small amounts of the solvent ranging from 0.5 to 1.0% phenylethanolamine carried overhead with the hydrocarbons. This mixture, referred to as the extract product stream, is removed from condenser 30 by conduit 19 to be treated as previously described in adsorption bed 20 for the removal of the small amounts of solvent contained therein. The bulk of the solvent remains in the bottom of the fractionating tower 16' and is recycled to primary extraction zone 12 by means of conduit 18.

In Figure 3, two adsorption beds are provided for each product stream, thereby making the over-all process fully continuous. The adsorption-desorption process for the removal of solvent from the extract product stream consists of extract product adsorption beds 31 and 32 together with extract product inlet conduits 35 and 36, solvent-free extract product outlet conduits 37, 38, and 39, desorbing reformate inlet conduits 26, 40, and 41, and solvent-containing reformate outlets 42, 43, and 27. The adsorption-desorption process for the removal of solvent from the raffinate product stream includes raffinate adsorption beds 33 and 34 together with raffinate product inlet conduits 44 and 45, solvent-free raffinate product outlet conduits 46, 47, and 48, desorbing light naphtha inlet conduits 49, 50, and 51, and solvent-containing light naphtha outlet conduits 52, 53, and 17.

In accordance with this process arrangement, the solvent extract product stream is obtained from secondary extraction zone 16 and the raffinate product stream is obtained from primary extraction zone 12 in the identical manner described for Figure 1.

The extract product stream in conduit 19 is transferred to bed 32 for an adsorption cycle by opening the valve in conduit 36. In the meantime, bed 31 is desorbed by transferring catalytic reformate in conduit 26, which is identical to the feed material to primary extraction zone 12, to bed 31 by opening the valve in conduit 41. The solvent-containing reformate is removed from bed 31 by opening the valve in conduit 43 and is transferred to the primary extraction zone 12 by means of conduits 27 and 11. The solvent-free extract product is removed from bed 32 by opening the valve in conduit 37 and is carried to storage or use by means of conduit 39. When the solvent concentration in the effluent from adsorption bed 32 exceeds a predetermined limit, the flow of extract product is transferred for an adsorption cycle in bed 31 by closing the valves in conduits 36 and 37 and opening the valves in conduits 35 and 38 while the flow of reformate is simultaneously transferred from bed 31 to bed 32 by closing the valves in conduits 41 and 43 and opening the valves in conduits 40 and 42. During the desorption cycle of bed 32, solvent-containing reformate is removed from bed 32 by means of conduit 43 and is transferred to primary extraction zone 12 by means of conduits 27 and 11. During the adsorption cycle in bed 31, solvent-free extract product is removed by means of conduits 38 and 39. When the solvent concentration from the effluent in bed 31 exceeds a predetermined limit, the flow of extract product is transferred from the bed 31 to bed 32 simultaneously with the transfer of reformate flow from bed 32 to bed 31, using the flow arrangements to these respective beds as first described.

The raffinate product stream is continuously treated for removal of solvent in much the same manner with the use of adsorption beds 33 and 34. The raffinate product in conduit 15 is transferred to bed 34 for an adsorption cycle by opening the valve in conduit 44. In the meantime, bed 33 is desorbed by transferring light naphtha in conduit 49, which is of the type desired for use in the secondary extraction zone 16, to bed 33 by opening the valve in conduit 51. The solvent-containing light naphtha is removed from bed 33 by opening the valve in conduit 53 and is transferred to the secondary extraction zone 16 by means of conduit 17. The solvent-free raffinate product is removed from bed 34 by opening the valve in conduit 46 and is carried to storage or use by means of conduit 48. When the solvent concentration in the effluent from adsorption bed 34 exceeds a predetermined limit, the flow of raffinate product is transferred for an adsorption cycle in bed 33 by closing the valves in conduits 44 and 46 and opening the valves in conduits 45 and 47, while the flow of light naphtha is simultaneously transferred from bed 33 to bed 34 by means of closing the valves in conduits 51 and 53 and opening the valves in conduits 50 and 52. During the desorption cycle of bed 34, solvent-containing light naphtha is removed from bed 34 by means of conduit 52 and is transferred to secondary extraction zone 16 by means of conduit 17. During the adsorption cycle in bed 33, solvent-free raffinate is removed by means of conduits 47 and 48. When the solvent concentration in the effluent from adsorption bed 33 exceeds a predetermined limit, the flow of raffinate product is transferred from bed 33 to bed 34 simultaneously with the transfer of light naphtha flow from bed 34 to bed 33 using the flow arrangement to these respective beds as first described. It will be apparent that in practicing this embodiment, that the time and operating temperature of the adsorption cycle for the extract product should be nearly the equivalent of the time and operating temperature of the desorption cycle for the extract product; and the time and operating temperature of the adsorption cycle for the raffinate product stream should be nearly the equivalent of the time and operating temperature of the desorption cycle for the raffinate product stream.

Other modifications of the process described herein may be readily made, and all such modifications are intended as covered by this invention as may reasonably be included within the scope of the appended claims.

We claim:

1. A hydrocarbon separation method comprising a selective solvent extraction process including contacting catalytic reformate with a hydroxyamine solvent to selectively extract the aromatic compounds of said reformate and removing the major part of said solvent from the extract to form an extract product stream and a raffinate product stream in combination with a process for recovering minor amounts of said solvent from said product streams resulting from said selective solvent extraction process, comprising the steps of passing at least one of said product streams through a bed of material selectively adsorbing said solvent, thereafter passing a hydrocarbon through said bed to remove said solvent from said bed, and returning said hydrocarbon and desorbed solvent to said selective solvent extraction process.

2. A hydrocarbon separation method comprising a selective solvent extraction process including contacting catalytic reformate with phenylethanolamine to selectively extract the aromatic compounds of said reformate and removing the major part of phenylethanolamine from the extract to form an extract product stream and a raffinate product stream in combination with a process for recovering minor amounts of phenylethanolamine from said product streams resulting from said selective solvent extraction process, comprising the steps of passing at least one of said product streams through a bed of material selectively adsorbing said phenylethanolamine, thereafter passing catalystic reformate through said bed to remove phenylethanolamine from said bed, and returning catalytic reformate and desorbed phenylethanolamine to said selective solvent extraction process.

3. A hydrocarbon separation method comprising a selective solvent extraction process including contacting catalytic reformate with phenylethanolamine to selectively extract the aromatic compounds of said reformate and removing the major part of phenylethanolamine from the extract to form an extract product stream and a raffinate product stream in combination with a process for recovering minor amounts of phenylethanolamine from said product streams resulting from said selective solvent extraction process, comprising the steps of passing at least one of said product streams through a bed of material selectively adsorbing said phenylethanolamine, thereafter passing a predominantly aliphatic hydrocarbon liquid boiling within the motor gasoline range through said bed to remove phenylethanolamine from said bed, and returning said aliphatic hydrocarbon and desorbed phenylethanolamine to said selective solvent extraction process.

4. A hydrocarbon separation method comprising a selective solvent extraction process including contacting catalytic reformate with a hydroxyamine solvent to selectively extract the aromatic compounds of said reformate and removing the major part of said solvent from the extract to form an extract product stream and a raffinate product stream in combination with a process for recovering minor amounts of said solvent from said product streams resulting from said selective solvent extraction process, comprising the steps of passing each product stream separately through a bed of material selectively adsorbing said solvent, thereafter passing a hydrocarbon through said bed to remove said solvent from said bed, and returning said hydrocarbon and desorbed solvent to said selective solvent extraction process.

5. A hydrocarbon separation method comprising a selective solvent extraction process including contacting catalytic reformate in a primary extraction zone with phenylethanolamine to selectively extract the aromatic compounds of said reformate and removing the major part of the solvent from the extract by re-extracting said extract in a secondary extraction zone with a predominantly aliphatic hydrocarbon liquid boiling within the motor gasoline range to form an extract product stream and a raffinate product stream in combination with a process for recovering minor amounts of phenylethanolamine from said product streams resulting from said selective solvent extraction process, comprising the steps of passing each product stream separately at a temperature below 250° F. through a bed of material selectively adsorbing said phenylethanolamine until said bed approaches saturation, thereafter passing catalytic reformate through said bed to remove said phenylethanolamine from said bed, and returning said catalytic reformate and desorbed phenylethanolamine to said primary extraction zone of said selective solvent extraction process.

6. A hydrocarbon separation method comprising a selective solvent extraction process including contacting catalytic reformate in a primary extraction zone with phenylethanolamine to selectively extract the aromatic compounds of said reformate and remove the major part of the solvent from the extract by re-extracting said extract in a secondary extraction zone with a predominantly aliphatic hydrocarbon liquid boiling within the motor gasoline range to form an extract product stream and a raffinate product stream in combination with a process for recovering minor amounts of phenylethanolamine from said product streams resulting from said selective solvent extraction process, comprising the steps of passing each product stream separately at a temperature below 250° F. through a bed of material selectively adsorbing said phenylethanolamine until said bed approaches saturation, thereafter passing said aliphatic hydrocarbon liquid through said bed to remove said phenylethanolamine from said bed, and returning said aliphatic hydrocarbon and desorbed phenylethanolamine to said secondary extraction zone of said selective solvent extraction process.

7. A hydrocarbon separation method comprising a selective solvent extraction process including contacting catalytic reformate in a primary extraction zone with phenylethanolamine to selectively extract the aromatic compounds of said reformate and removing the major part of the solvent from the extract by re-extracting said extract in a secondary extraction zone with a predominantly aliphatic hydrocarbon liquid boiling within the motor gasoline range to form an extract product stream and a raffinate product stream in combination with a process for recovering minor amounts of phenylethanolamine from said product streams resulting from said selective solvent extraction process, comprising the steps of passing each product stream at a temperature below 250° F. through a separate bed of material selectively adsorbing said phenylethanolamine until each bed approaches saturation, passing catalytic reformate through one of said beds to remove said phenylethanolamine from said bed, returning said catalytic reformate and desorbed phenylethanolamine to said primary extraction zone of said selective solvent extraction process, passing said aliphatic hydrocarbon liquid through the other of said beds to remove said phenylethanolamine from said bed, and returning said aliphatic hydrocarbon liquid and desorbed phenylethanolamine to said secondary extraction zone of said selective solvent extraction process.

References Cited in the file of this patent

UNITED STATES PATENTS

| | | |
|---|---|---|
| 2,167,730 | Smoley | Aug. 1, 1939 |
| 2,398,101 | Lipkin | Apr. 9, 1946 |
| 2,645,596 | Axe | July 14, 1953 |
| 2,651,594 | Blatz | Sept. 8, 1953 |
| 2,726,986 | Gross | Dec. 13, 1955 |
| 2,858,902 | Cottle | Nov. 4, 1958 |